United States Patent
Lau et al.

(10) Patent No.: US 6,513,106 B1
(45) Date of Patent: Jan. 28, 2003

(54) MIRROR ADDRESSING IN A DSP

(75) Inventors: Winnie Lau, San Jose, CA (US); Ronen Perets, Herzliyya (IL)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/449,403

(22) Filed: Nov. 26, 1999

(51) Int. Cl.$^7$ ................................................ G06F 12/00

(52) U.S. Cl. .......................... 711/221; 711/5; 711/170; 711/217; 365/230.03; 365/238.5

(58) Field of Search ...................... 365/230.03, 230.06, 365/230.08, 238.5; 711/5, 153, 154, 156, 170, 171, 172, 173, 201, 202, 212, 214, 217, 220, 221

(56) References Cited

U.S. PATENT DOCUMENTS

| | | | | |
|---|---|---|---|---|
| 4,305,134 A | * | 12/1981 | Joyce et al. ................ | 708/497 |
| 4,453,230 A | * | 6/1984 | Mizoguchi et al. ......... | 711/207 |
| 5,537,576 A | * | 7/1996 | Perets et al. ................ | 711/150 |
| 5,553,023 A | * | 9/1996 | Lau et al. ................ | 365/189.01 |
| 5,553,263 A | * | 9/1996 | Kalish et al. ................ | 711/127 |
| 5,606,680 A | * | 2/1997 | Parvereshi et al. ......... | 711/200 |
| 5,717,885 A | * | 2/1998 | Kumar et al. ................ | 711/207 |
| 5,966,737 A | * | 10/1999 | Steely et al. ................ | 711/213 |
| 6,154,805 A | * | 11/2000 | Parvereshi et al. ............ | 711/2 |
| 6,301,631 B1 | * | 10/2001 | Chambers et al. .......... | 710/313 |

OTHER PUBLICATIONS

Kessler, R. E., et al, "Evaluating Stream Buffers as a secondary Cache Replacement," Apr. 1994, ACM SIGARCH Computer Architecture News, Proceding of teh 21st annual international symposium on computer architecture, vol. 22, issue 2, pp. 24–33.*

* cited by examiner

*Primary Examiner*—Do Hyun Yoo
*Assistant Examiner*—Christian P. Chace
(74) *Attorney, Agent, or Firm*—Dewan & Lally, LLP

(57) ABSTRACT

A method and system for implementing a mirror addressing scheme in conjunction with a symmetrical data table are disclosed. The method includes receiving a first address. In response to determining that the first address corresponds to an upper portion of a data table, generating a second address from the first address, where the second address corresponds to a lower portion of the data table. The method further includes using the second memory address to access a memory array, whereby data corresponding to the upper portion of the data table is accessed from the lower portion of the data table. In one embodiment, determining that the first address corresponds to an upper portion of the data table is achieved by determining upper segment and lower segment boundaries for the first memory address determining that the most significant bit of the lower segment is asserted. Generating the second memory address from the first memory address may include complementing the lower segment of the first memory address and combining the complemented lower segment with the upper segment of the first memory address. In one embodiment, the method includes writing a buffer size register with a value indicative of the size of the number of entries in the symmetric data table. In this embodiment, determining the lower segment boundary may include determining the most significant bit of the buffer size register that is asserted. In alternative embodiments, complementing the lower segment address may comprise generating a 2's complement of the lower segment if the symmetry of the symmetric data table is odd and generating a 1's complement of the lower segment address if the symmetry of the data table is even.

22 Claims, 3 Drawing Sheets

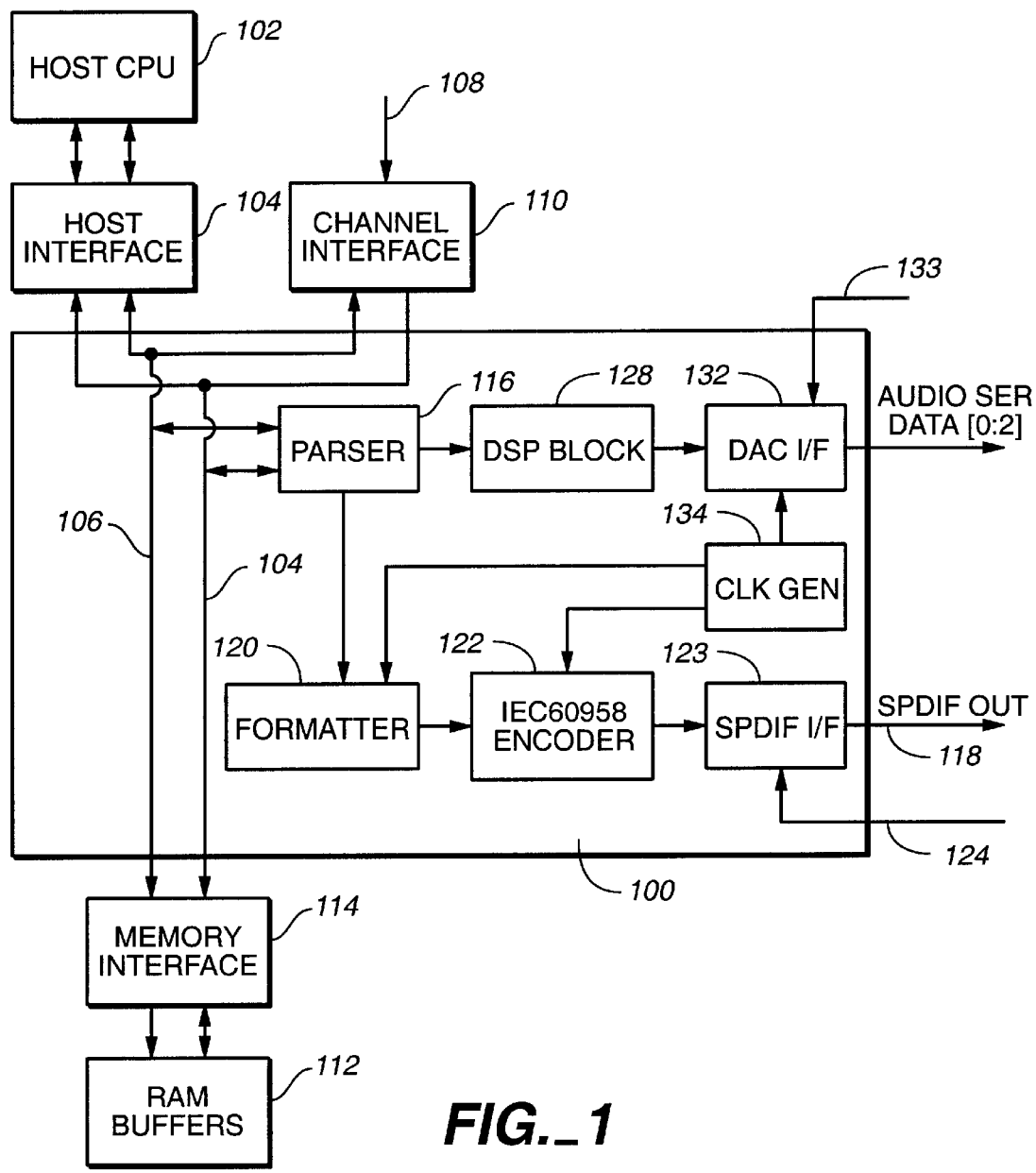
FIG._1

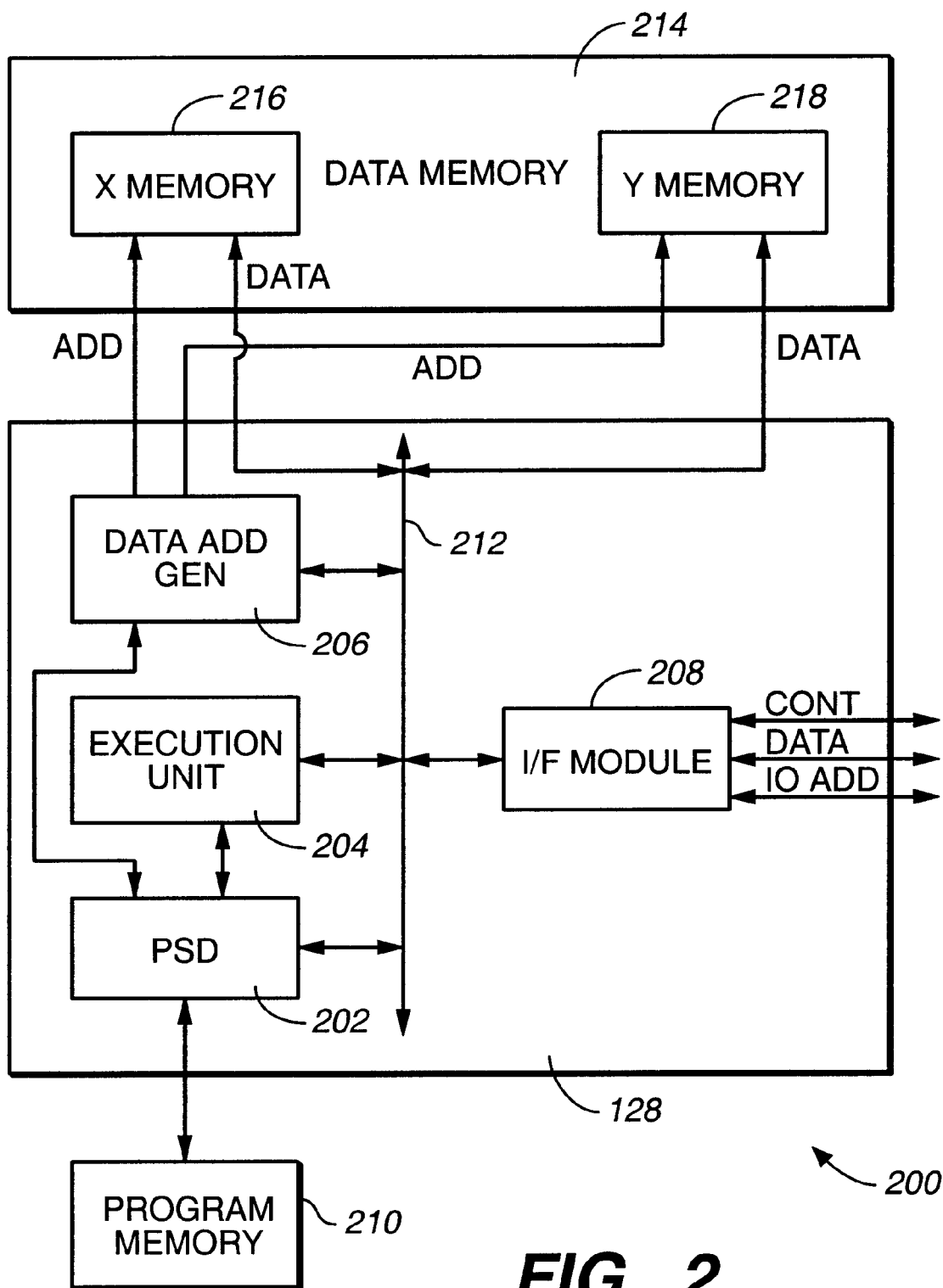
FIG._2

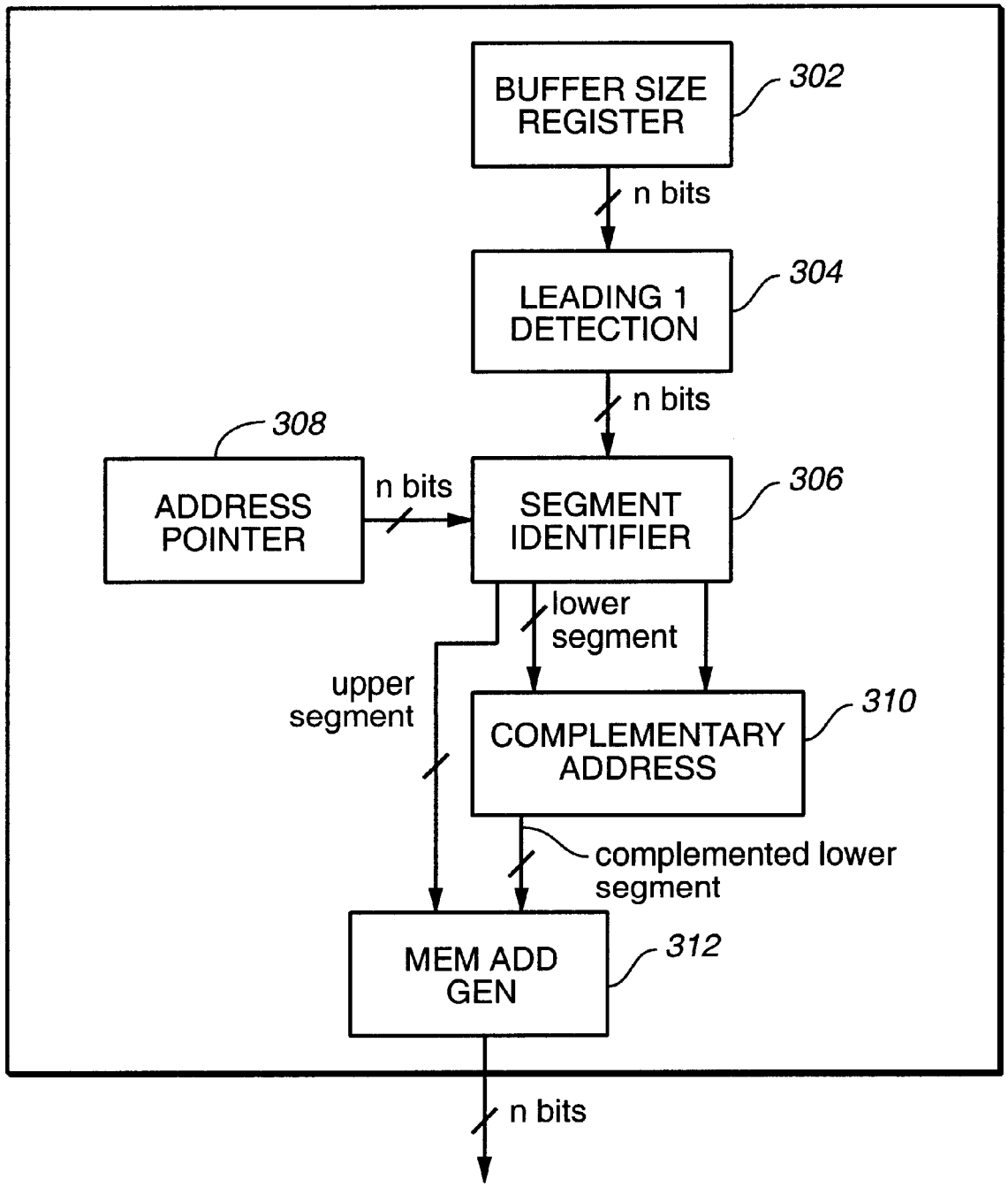
FIG._3

MIRROR ADDRESSING IN A DSP

BACKGROUND OF THE INVENTION

1. Field of the Invention

The present invention is related to the field of solid state memory systems and more particularly to a method and circuit for implementing a hardware based mirror addressing mechanism.

2. Description of the Relevant Art

In the field of digital signal processing (DSP), it is not uncommon to encounter data structures that are characterized by recurring, repetitive, or cyclical values. Trigonometric functions, for example, are frequently implemented in DSP's by utilizing multiple entry data tables that contain values of a function at various input points. When the function is called by an application program, the input value in the function called is used to index the table. The value corresponding to the indexed entry is returned as the value for the function call. Because memory is precious, it is desirable to attempt to conserve memory space by eliminating redundant data values from a data table such that the data table contains only a single copy of the each value. In addition, it would be beneficial if the implemented solution for reducing the size of a symmetrically arranged data structure was transparent to the application programmer and did not measurably affect system performance.

SUMMARY OF THE INVENTION

A method and system for implementing a mirror addressing scheme in conjunction with a symmetrical data table are disclosed. The method includes receiving a first address. In response to determining that the first address corresponds to an upper portion of a data table, generating a second address from the first address, where the second address corresponds to a lower portion of the data table. The method further includes using the second memory address to access a memory array, whereby data corresponding to the upper portion of the data table is accessed from the lower portion of the data table. In one embodiment, determining that the first address corresponds to an upper portion of the data table is achieved by determining upper segment and lower segment boundaries for the first memory address determining that the most significant bit of the lower segment is asserted. Generating the second memory address from the first memory address may include complementing the lower segment of the first memory address and combining the complemented lower segment with the upper segment of the first memory address. In one embodiment, the method includes writing a buffer size register with a value indicative of the size of the number of entries in the symmetric data table. In this embodiment, determining the lower segment boundary may include determining the most significant bit of the buffer size register that is asserted. In alternative embodiments, complementing the lower segment address may comprise generating a 2's complement of the lower segment if the symmetry of the symmetric data table is odd and generating a 1's complement of the lower segment address if the symmetry of the data table is even.

The invention further contemplates an address generation unit, comprising a buffer size register suitable for indicating the size of a symmetric data table, a detection circuit adapted to determine whether a first address received by the data address generation circuit corresponds to an upper portion of the symmetric data table or a lower portion of the data table, and an address generator. The address generator is adapted to generate a second memory address from the first memory address if the detection circuit determines that the first address corresponds to the upper portion of the symmetric data table. In this manner, the second address corresponds to the lower portion of the data table such that data associated with the first address and its corresponding second address are stored in a common location. In one embodiment, the least significant N bits of the buffer size register are asserted to indicate a buffer size of $2^N$. In one embodiment, the detecting circuit determines the boundaries of an upper segment of the first memory address and a lower segment of the first address. The most significant asserted bit in the buffer size register may indicate an upper boundary of the lower segment. The address generator may generate a second address from the first address by complementing the lower segment of the first address and concatenating the complemented lower segment with the upper segment of the first address. The address generator may complement the lower segment in a 2's complement manner for a data table with odd symmetry and in a 1's complement manner for a data table with even symmetry.

BRIEF DESCRIPTION OF THE DRAWINGS

Other objects and advantages of the invention will become apparent upon reading the following detailed description and upon reference to the accompanying drawings in which:

FIG. 1 is a simplified block diagram of a decoder system in which a DSP according to the present invention may be implemented;

FIG. 2 is a block diagram of selected portions of the DSP of FIG. 1; and

FIG. 3 is a block diagram of selected portions of the DSP of FIG. 2.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to drawings, FIG. 1 presents a block diagram of a decoder system 100 in which the present invention may be suitably implemented. The depicted embodiment of system 100 comprises an audio decoder suitable for receiving coded audio signals from, for example, a DVD player and for producing PCM, S/P DIF or other audio signals suitable for use with conventional audio DAC's and other circuitry. Although the depicted embodiment of system 100 contemplates an audio decoder, it will be appreciated that the utilization of a symmetrically arranged memory table as described herein may be implemented in any of a variety of systems.

In the depicted embodiment, audio decoder 100 is connected a host CPU 102 through a host interface 104 that provides address and data signals to audio decoder 100 via an address bus 106 and a data bus 104. Encoded data 108 is provided to audio decoder 100 via a channel interface 110 that is also connected to address bus 106 and data bus 104.

A memory array 112 provides a storage facility for the channel buffers of audio decoder 100 through a memory interface 114.

The depicted embodiment of audio decoder 100 includes a parser 116 that receives address and data via buses 106 and 104 respectively. Parser 116 is suitable for extracting useful information from audio encoded data and forwarding the extracted data for further processing. The SPDIF formatted data is routed to an SPDIF output signal 118 via a formatter 120 and an IEC 60958 encoder 122. An SPDIF input signal 124 provides an alternative input for SPDIF output signal 118 when audio decoder 100 is in a audio bypass mode. Audio serial data from parser 116 is routed to a DSP core block 128. DSP core block 128 is suitable for performing a variety of operations on audio serial data as will be familiar to those in the field of digital signal processing. DSP core block 128 includes one or more data memory elements as will be discussed in greater detail below. DSP core block 128 provides an audio output signal 130 to a digital-to-analog interface block 132. Digital-to-analog interface 132 is adapted to provide a three bit audio serial data output that is suitable for being received by any of a variety of industry standard commercial audio digital-to-analog converters (DACs). A clock generator 134 of audio decoder 100 provides suitable clocks for the various blocks of audio decoder 100 including DSP core 128, digital-to-analog interface 132, and IEC 60598 encoder 122. An external audio serial data input signal 133 is provided for use in a bypass mode of audio decoder 100. Audio decoder 100 is suitable for receiving an audio signal in an encoded format such as MPEG formatting producing an audio output, such as a linear PCM audio output, suitable for use with a variety of industry standard audio equipment.

Turning now to FIG. 2, a simplified block diagram of a DSP 200 suitable for use in a DSP core 128 is provided. In the depicted embodiment, DSP 200 includes a program sequencer and decoder (PSD) 202, an execution unit 204, a data address generation unit 206, and an interface (I/F) module 208. PSD 202 provides program addresses to a program memory 210 and receives program instructions from program memory 210. Execution unit 204 receives instructions from PSD 202 and executes the instructions in conjunction with data retrieved from DSP bus 212. PSD 202 sends control signals to data address generation unit 206 indicating how to generate the next address to data memory 214 comprised of an X memory 216 and a Y memory 218. The interface module 208 is connected to DSP bus 212 and provides data, address, and control signals suitable for communicating with the surrounding components of audio decoder 100.

Tuning now to FIG. 3, additional detail of data address and generation unit 206 is provided. In the depicted embodiment a data-address generation unit 206 is configured to receive a data address from PSD 202. In the preferred embodiment, data address generation unit 206 is further configured to generate an X memory address and a Y memory address from the address received from PSD 202. Data address generation unit 206 according to the present invention is configured to facilitate mirror addressing of data memory 214 in conjunction with the addressing of a symmetric data table stored in data memory 214 by first determining whether an address received by data address generation circuit 206 corresponds to an upper portion of the symmetric data table or a lower portion of the data table. If the received address is determined to correspond to an upper portion of the data table, a second memory address is generated from the first memory address, where the second address corresponds to the symmetric memory location of the first address in the lower portion of the data table. In this manner, data address generation 206 is suitable for addressing a data table or look-up table that contains symmetrically arranged data. When a particular data structure or data base exhibits symmetric or repeating characteristic such as, for example, a table containing coefficients for a sine or cosine wave, memory efficiency can be achieved by storing just a single copy of a particular coefficient and manipulating the addressing of the data table such that all addresses corresponding to a particular coefficient value are converted to a single common address in which the coefficient is stored. If, for example, a symmetric data table includes a value of X stored in a first address (A) in an upper portion of the data table and also in a second address (A') in a lower portion of the data table, where A and A' are mirror addresses, all references to location A would be transformed to references for location A' so that the value need only be stored in location A'. Such a mirror addressing scheme has been typically accomplished by software manipulation of memory address in which a subroutine is called each time a memory is accessed to calculate the mirror address and substitute the mirror address for the original address. Unfortunately, the software manipulation of memory addresses results in a performance degradation of the DSP due to the execution time of the added instructions and additional traffic on the DSP bus 212. The present invention contemplates achieving the memory savings offered with a mirror addressing scheme without the performance penalty incurred in implementations in which software is responsible for performing the mirror addressing. Although the depicted embodiment is disclosed with respect to a symmetric data table with $2^N$ entries where N is an integer, it is to be understood that the invention contemplates the more general case of a data table including $2^N$ entries where N is an integer. In this more general embodiment, the dividing point between the upper portion of the table and the lower portion is the $N^{th}$ entry and the transformation from a received address in the upper portion to an address in the lower portion is achieved by subtracting the received address from the number of entries in the table (i.e., $2^N$). Thus, in a table with 20 entries, the $10^{th}$ entry is the dividing point between the lower portion and the upper portion. If an address of "12" is received, an address in the lower portion is generated by subtracting 12 from 20 to generate an address value of 8.

Turning now to FIG. 3, a simplified block diagram of the data address generation unit 206 according to one embodiment of the present invention is provided. As depicted in FIG. 3, data address generation unit 206 includes a buffer size (BS) register 302. The buffer size register 302 defines the size of the symmetrically arranged data table. If, for example, the table of symmetric data comprises $2^N$ data entries, then buffer size register 302 is written with a value of $2^N-1$ (i.e., the N most least significant bits in the register are asserted). Thus, if the symmetrical data table includes 16 entries and buffer size register 302 includes a total of 12 bits, the value stored in buffer size register 302 is 00F hexadecimal (000000001111 binary).

To implement the mirror addressing scheme described herein, data address generation unit 206 includes a leading 1 detection circuit 304 suitable for determining the boundaries of an upper segment of a lower segment for addresses attempting to access the symmetric data table. Leading 1 detection circuit 304 determines these boundaries by finding the most significant bit position in buffer size register 302 that contains a 1. In the example of a 16 entry buffer size, leading 1 detection circuit 304 is configured to determine that bit position 3 of the buffer size register 302 is the most significant bit position of register 302 that contains a 1 and to generate a segment mask that identifies the upper segment from the lower segment. The bit position of the most significant bit in register 302 that contains a 1 defines the upper boundary of the lower segment according to one embodiment of the present invention. A segment identifier circuit 306 receives the segment mask produced by leading 1 detection circuit 304. The segment mask received from leading 1 detection circuit 304 is combined with a memory address generated by a memory address pointer 308 in segment identifier circuit 306. Segment identifier circuit 306 utilizes the segment mask from leading 1 detection unit 304 to pass the upper segment bits of the address received from address pointer 308 to a memory address generation circuit 312 without change. In addition, segment identifier circuit 306 utilizes the segment mask to pass the lower segment bits of the address received from address pointer 308 to a complementary address generator 310. Complementary address generator 310 is adapted to generate the complement of an address received from segment identifier unit 306 if the most significant bit of the received address is asserted. In the preferred embodiment, complementary address generator 310 generates a complement of the lower segment address received from segment identifier 306 if the most significant bit of the lower segment address is asserted. In this embodiment, the assertion of the most significant bit of the lower segment indicates an address that corresponds to an upper portion of the memory table. To eliminate the need to essentially duplicate the lower portion of the symmetrically arranged memory table, addresses that attempt to access the upper portion of the memory table are converted to their symmetrical "partners" in the lower portion of the memory table. In one embodiment suitable for use with a symmetric memory table that contains odd symmetry segment identifier logic 306 produces a 2's complement enable signal 309 that effects the function of complementary address generator 310. More specifically, when 2's complement enable signal 309 is asserted, complementary address generator 310 produces a 2's complement of the received address. Conversely, when 2's complement signal 309 is negated, the complementary address generator 310 produces a 1's complement output.

As shown in FIG. 3, segment identifier logic 306 receives an address comprised of an upper segment and a lower segment from address pointer 308. The upper segment of the address is provided to a memory address generation circuit 312 without change. If the address is in an upper portion of the symmetric table, the lower segment of the address is complemented, in either a 1's complement or 2's complement fashion (depending on the symmetry of the data table under consideration), to the memory address generation circuit 312. In this manner, segment identifier logic 306 complements the lower segment of an address while leaving the upper segment unchanged. Utilizing this circuitry, the data address generation unit 206 according to the present invention supports mirror addressing that is transparent to the system programmer. Moreover, by implementing mirror addressing and hardware, the benefits of reduced size memory table are achieved without the performance degradation characteristic of software mirror addressing schemes.

To illustrate the operation of data address generation unit 206, imagine a buffer size register 302 of 12 bits and a symmetric memory table with a total of 16 entries. In a first example, the memory table is characterized by odd symmetry. In a 16 entry table with odd symmetry, the first 9 entries (entries 0 through 8) contain unique elements. Thereafter, elements 9 through 15 contain mirror copies of elements 7 through 1. In other words, the $9^{th}$ entry and the $7^{th}$ entry contain common data, the $10^{th}$ entry and the $6^{th}$ entry contain common data, and so forth. In this embodiment, the buffer size register 302 would be written with a hexadecimal value of 00F to indicate that the memory table has 16 entries. The leading 1 detection circuit 304 would determine that bit position 3 of buffer size register 302 is the most significant bit position containing a 1. In other words, bit position 3 is the leading 1 bit position. Thus, for this example, the upper segment comprises bit positions 4 through 15 while the lower segment comprises bit positions 0 through 3. In response to determining the upper segment and lower segment boundaries, leading 1 detection circuit 304 generates a 12 bit segment mask that identifies the upper segment bits from the lower segment bits. The 12 bit segment mask is provided to segment identifier logic 306 which also receives an address from address pointer 308. For this example, the address received from address pointer 308 is hexadecimal 019. In this example, the upper 8 bits of the address received from address pointer 308 comprise the upper segment of the address, which are forwarded to memory address generation logic 312 without change. Because the most significant bit of lower segment is asserted the lower 4 bits, of the address, are routed to complementary address generator 310. In a case such as this in which the memory table is characterized by odd symmetry, the 2's complement enable signal 309 is asserted. With 2's complement enable signal 309 asserted, the complementary address generator circuit 310 produces the 2's complement of the lower segment of the address received from address pointer 308. In the example in which the address comprises 019, the 2's complement of the lower segment is a hexadecimal 7 that is routed to memory address generation logic 312. When combined with the upper segment, which was routed from segment identifier circuit 306 without change, it will be appreciated that data address generation unit 206 provides a 12 bit address to memory address generator 312 with a value of hexadecimal 017. In this manner, data address generation unit 206 according to the present invention coverts the first address (019h) to a second address where the first and second addresses correspond to a common data value in a symmetric data table (i.e., the value of entry 9 in the table and the value of entry 7 are the same). Because the original memory table was characterized by odd symmetry, the value stored in address location 9 is equivalent to the address stored in address location 7. By converting address values of 9 to address values of 7, the need to maintain a separate copy of the data in memory address 9 is eliminated thereby reducing the size of the memory table in a manner the incurs essentially no performance degradation and is transparent to the programmer. If the memory table under consideration is characterized by even symmetry, the 2's complement enables signal 309 is negated and complementary address generator 310 generates a 1's complement of the lower segment address received from segment identifier logic 306. In a 16 entry table with even symmetry, the data in locations 0 and 15 are the same, the data stored in locations 1 and 14 are the same, and so forth. Using the previous example, in which the lower segment of the address received from address pointer 308 contains a 9, complement address generator 310 would generate the 1's complement of 9 to produce a lower segment of 6 that is provided to memory address generator 312. Thus, whether the memory table under consideration is characterized by even or odd symmetry, the data address generation unit 206 is suitable for implementing a mirror addressing scheme to reduce memory consumption without performance penalty in manner that is transparent to the system programmer.

It will therefore be appreciated by those skilled in the field having the benefit of this disclosure that the present invention contemplates a method and circuit for achieving a hardware-based mirror addressing mechanism to reduce memory consumption without effecting system performance. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of addressing a symmetric data table, comprising:

receiving a first address;

responsive to determining that the first address corresponds to an upper portion of a data table, generating a second address from the first address, where the second address corresponds to a lower portion of the data table; and using the second memory address to access a memory array, whereby data corresponding to the upper portion of the data table is accessed from the lower portion of the data table.

2. The method of claim 1, wherein determining that the first address corresponds to an upper portion of the data table comprises:

determining upper segment and lower segment boundaries for the first memory address; and determining that the most significant bit of the lower segment is asserted.

3. The method of claim 2, wherein generating the second memory address from the first memory address includes complementing the lower segment of the first memory address and combining the complemented lower segment with the upper segment of the first memory address.

4. The method of claim 2, further comprising writing a buffer size register with a value indicative of the size of the number of entries in the symmetric data table.

5. The method of claim 4, wherein determining the lower segment boundary comprises determining the most significant bit of the buffer size register that is asserted.

6. The method of claim 2, wherein the complementing of the lower segment address comprises generating a 2's complement of the lower segment if the symmetry of the symmetric data table is odd.

7. The method of claim 6, wherein the complementing of the upper segment address comprises generating a 1's complement of the lower segment address if the symmetry of the symmetric data table is even.

8. The method of claim 2, further comprising using the second memory address to access a memory array whereby data corresponding to the first address and data corresponding to the second address are stored in a common memory location.

9. An address generation unit, comprising:

a buffer size register suitable for indicating the size of a symmetric data table;

a detection circuit adapted to determine whether a first address received by the data address generation circuit corresponds to an upper portion of the symmetric data table or a lower portion of the data table; and an address generator adapted to generate a second memory address from the first memory address responsive to the detection circuit determining that the first address corresponds to the upper portion of the symmetric data table, wherein the second address corresponds to the lower portion of the data table such that data associated with the first address and its corresponding second address is stored in a common location.

10. The address generation unit of claim 9, wherein the least significant N bits of the buffer size register are asserted to indicate a buffer size of $2^N$.

11. The address generation unit of claim 9, wherein the detecting circuit determines the boundaries of an upper segment of the first memory address and a lower segment of the first address.

12. The address generation unit of claim 11, wherein the most significant asserted bit in the buffer size register indicates an upper boundary of the lower segment.

13. The address generation unit of claim 11, wherein the address generator generates a second address from the first address by complementing the lower segment of the first address and concatenating the complemented lower segment with the upper segment of the first address.

14. The address generation unit of claim 13, wherein the address generator complements the lower segment in a 2's complement manner.

15. The address generation unit of claim 13, wherein the address generator complements the lower segment in a 1's complement manner.

16. A digital signal processor comprising:

a program sequencer and decoder configured to retrieve instructions from a program memory and adapted to produce a data memory address;

an execution unit configured to receive a decoded instruction from the program sequencer and decoder and to execute the decoded instruction; and a data address generation unit comprising, a buffer size register suitable for indicating the size of a symmetric data table, a detection circuit adapted to determine whether a first address received by the data address generation circuit corresponds to an upper portion of the symmetric data table or a lower portion of the data table, and an address generator adapted to generate a second memory address from the first memory address responsive to the detection circuit determining that the first address corresponds to the upper portion of the symmetric data table, wherein the second address corresponds to the lower portion of the data table such that data associated with the first address and its corresponding second address is stored in a common location.

17. The digital signal processor of claim 16, wherein the least significant N bits of the buffer size register are asserted to indicate a buffer size of $2^N$.

18. The digital signal processor of claim 16, wherein the detecting circuit determines the boundaries of an upper segment of the first memory address and a lower segment of the first address.

19. The digital signal processor of claim 18, wherein the most significant asserted bit in the buffer size register indicates an upper boundary of the lower segment.

20. The digital signal processor of claim, 18, wherein the address generator generates a second address from the first address by complementing the lower segment of the first address and concatenating the complemented lower segment with the upper segment of the first address.

21. The digital signal processor of claim 20, wherein the address generator complements the lower segment in a 2's complement manner.

22. The digital signal processor of claim 20, wherein the address generator complements the lower segment in a 1's complement manner.

* * * * *